(12) United States Patent
Prater

(10) Patent No.: US 6,229,676 B1
(45) Date of Patent: May 8, 2001

(54) FERROFLUID SEAL FOR ACTUATOR BEARING

(75) Inventor: Walter Lloyd Prater, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/192,099

(22) Filed: Nov. 13, 1998

(51) Int. Cl.[7] .............................. G11B 5/53; H02K 5/24
(52) U.S. Cl. ................................ 360/265.3; 360/265.6; 310/67 R
(58) Field of Search ............................... 360/106, 99.08, 360/265.3, 265.6; 310/90, 90.5; 384/478, 133, 37 R, 90

(56) References Cited

U.S. PATENT DOCUMENTS

| | | | |
|---|---|---|---|
| 4,254,961 | * 3/1981 | Fersht et al. | 277/80 |
| 4,890,174 | 12/1989 | Chalmers et al. | 360/78.12 |
| 5,009,436 | * 4/1991 | Endo et al. | 277/80 |
| 5,011,165 | 4/1991 | Cap | 277/80 |
| 5,047,677 | * 9/1991 | Mineta et al. | 310/67 R |
| 5,050,891 | 9/1991 | Ishikawa | 277/80 |
| 5,057,952 | 10/1991 | Takahashi | 360/97.02 |
| 5,061,868 | * 10/1991 | Iwazaki et al. | 310/67 R |
| 5,132,856 | 7/1992 | Takahashi | 360/99.08 |
| 5,215,313 | 6/1993 | Yokoushi et al. | 277/80 |
| 5,271,631 | 12/1993 | Yokoushi et al. | 277/80 |
| 5,323,076 | 6/1994 | Hajec | 310/90 |
| 5,600,511 | 2/1997 | Dunfield et al. | 360/97.02 |
| 5,653,541 | 8/1997 | Ishizuka et al. | 384/478 |
| 5,667,309 | 9/1997 | Nose | 384/132 |
| 5,675,199 | * 10/1997 | Miyakoshi et al. | 310/90 |

FOREIGN PATENT DOCUMENTS

07111028 * 4/1995 (JP).
09163660 * 6/1997 (JP).

OTHER PUBLICATIONS

Jul. 1983 IBM Internal Disclosure Bulletin (Seal To Isolate Actuator From Head/Disk Assembly).
Aug. 1983 IBM Internal Disclosure Bulletin (Enhanced Compact Magnetic Fluid Seal).

* cited by examiner

Primary Examiner—Hoa T. Nguyen
Assistant Examiner—Angel Castro
(74) Attorney, Agent, or Firm—Noreen A. Krall; Robert B. Martin; Felsman, Bradley, Vaden, Gunter & Dillon, LLP

(57) ABSTRACT

A ferrofluid seal for a hard disk drive actuator bearing has two circular plates which are axially spaced apart about a nonmagnetic pivot shaft of the actuator. The plates are parallel and in close proximity to one another. The upper plate is made of magnetically-conductive steel and is mounted to a stationary sleeve which surrounds the shaft. The lower plate is mounted to the shaft and has an annular magnet with pole pieces on an upper surface. A magnetic ferrofluid is located between the magnet and the upper plate to complete the magnetic circuit and form a seal. The ferrofluid seal prevents bearing emissions such as grease oil vapor and aerosol droplets from contaminating the disk drive.

2 Claims, 2 Drawing Sheets

FERROFLUID SEAL FOR ACTUATOR BEARING

TECHNICAL FIELD

This invention relates in general to hard disk drives and in particular to a seal for the actuator bearing of a hard disk drive.

BACKGROUND ART

Hard disk drives utilize a pivotable actuator with magnetic heads to read information from and to write information to magnetic disks. As shown in FIG. 1, the actuator 11 is typically mounted to a motor-driven pivot shaft 13 which rotates the heads on actuator 11 to precise locations on the disks (not shown). Shaft 13 is surrounded by a stationary housing 15. At least one pivot bearing 17 is mounted between housing 15 and shaft 13 to enhance the stability of shaft 13 as it pivots actuator 11. During operation, bearing 17 emits oil vapor and aerosol droplets of grease which are a potential source of contamination in the disk drive. Reducing this type of contamination is important to improve the reliability of disk drives.

Prior art disk drives have used several different types of seals to seal the actuator pivot bearings in disk drives. One type of bearing seal, known as a ferrofluid seal, is practically impermeable to emissions from bearings and is fairly well known in the art. Ferrofluids contain very small magnetic particles which are suspended in a carrier fluid. Ferrofluid seal 21 (FIGS. 1 and 2) utilizes shaft 13 which is formed from a magnetic material, such as 400 series martensitic stainless steel, and a magnet 23 mounted to housing 15. Magnet 23 is spaced apart from shaft 13 by a very small gap 25. Ferrofluid seal 21 functions by suspending a magnetically attracted fluid 27 in gap 25 between magnet 23 and shaft 13 to complete the magnetic circuit (see magnetic flux lines 29 in FIG. 2). The suspended fluid 27, which is essentially frictionless, forms an effective liquid seal between the pivoting shaft 13 and housing 15.

Recently, non-magnetic materials for disk drives have become increasingly popular with disk drive designers for their ability to match the coefficient of thermal expansion of the actuator. Unfortunately, disk drives which utilize nonmagnetic actuator shafts are incompatible with conventional ferrofluid seals. A ferrofluid bearing seal for disk drives with nonmagnetic elements is needed.

DISCLOSURE OF THE INVENTION

A ferrofluid seal for a hard disk drive actuator bearing has two circular plates which are axially spaced apart about a nonmagnetic pivot shaft of the actuator. The plates are parallel and in close proximity to one another. The upper plate is made of magnetically-conductive steel and is mounted to a stationary sleeve which surrounds the shaft. The lower plate is mounted to the shaft and has an annular magnet with pole pieces on an upper surface. A magnetic ferrofluid is located between the magnet and the upper plate to complete the magnetic circuit and form a seal. The ferrofluid seal prevents bearing emissions such as grease oil vapor and aerosol droplets from contaminating the disk drive.

BEST MODE FOR CARRYING OUT THE INVENTION

Figure 1:
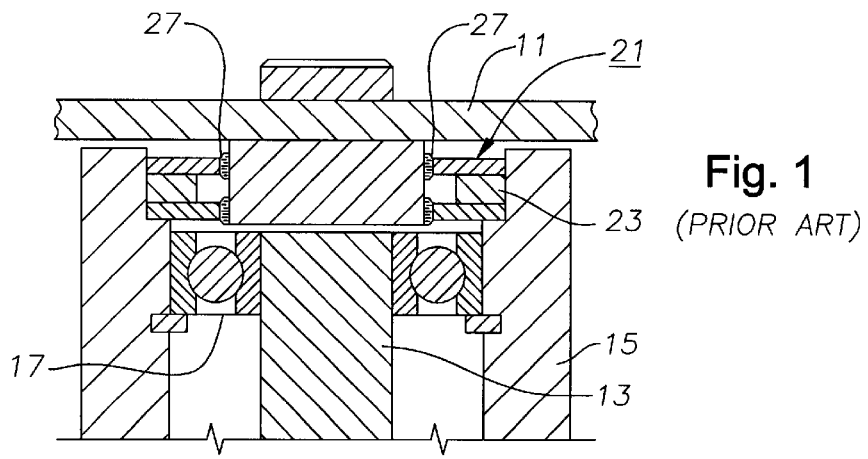
FIG. 1 is a sectional side view of a prior art ferrofluid seal for an actuator bearing in a hard disk drive.
Figure 2:
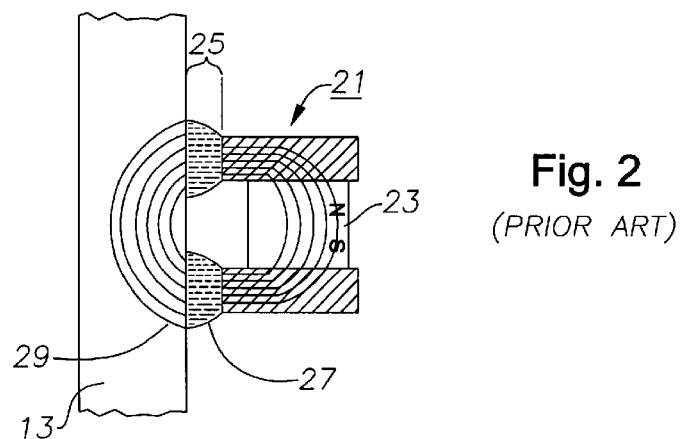
FIG. 2 is an enlarged sectional side view of half of the seal of FIG. 1.
Figure 3:
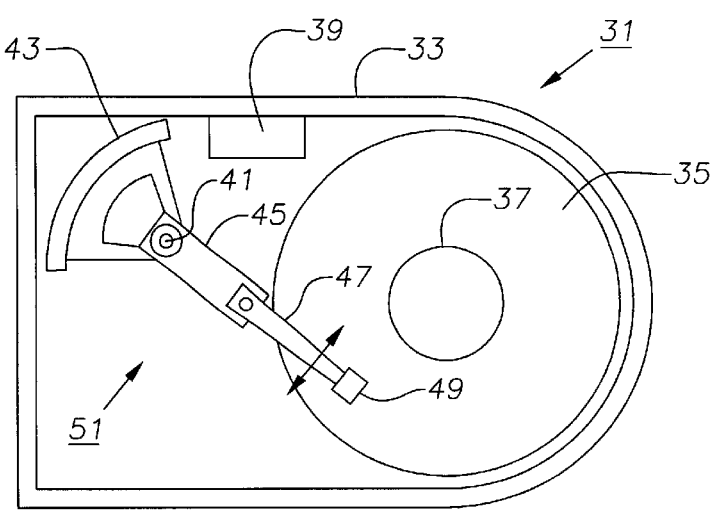
FIG. 3 is a top schematic view of a hard disk drive constructed in accordance with the invention.

Referring to FIG. 3, a schematic drawing of an information storage system comprising a magnetic hard disk drive 31 is shown. Drive 31 has a base 33 containing a plurality of stacked, parallel magnetic disks 35 (one shown) which are closely spaced apart. Disks 35 are rotated by a motor located therebelow about a central drive hub 37. An actuator 51 is pivotally mounted to base 33 about a pivot assembly 41. A controller 39 is mounted to base 33 for selectively moving actuator 51 as will be described below.

Actuator 51 has a mounting support 45, a pair of parallel, cantilevered load beams or suspensions 47 extending from mounting support 45, and a head gimbal assembly 49 having at least one magnetic read/write head secured to each suspension 47 for magnetically reading data from or magnetically writing data to disks 35. Suspensions 47 have a spring-like quality which biases or maintains them in parallel relationship relative to one another. A motor assembly 43 having a conventional voice coil motor is also mounted to pivot assembly 41 opposite head gimbal assemblies 29. Movement of actuator 51 (indicated by arrows) moves head gimbal assemblies 29 radially across tracks on the disks 35 until the heads on assemblies 29 settle on the target tracks.

Figure 4:
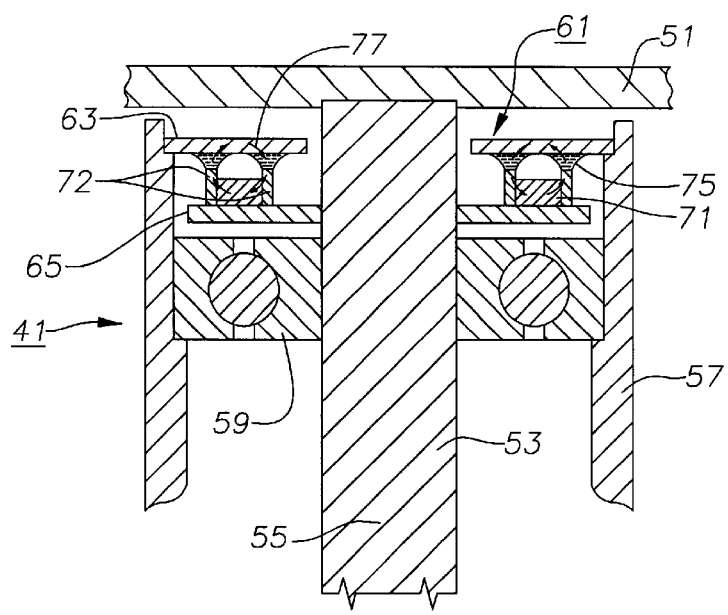
FIG. 4 is a sectional side view of a first embodiment of a ferrofluid seal for an actuator bearing of the hard disk drive of FIG. 3 constructed in accordance with the invention.
Figure 5:
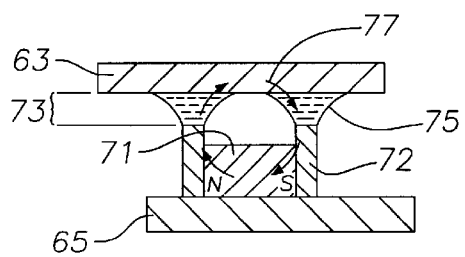
FIG. 5 is an enlarged half-sectional side view of the seal of FIG. 4.

Referring now to FIGS. 4 and 5, actuator 51 is mounted to a nonmagnetic pivot shaft 53. Shaft 53 rotates the heads on actuator 51 about an axis 55 to precise locations on the disks. Shaft 53 is surrounded by a stationary coaxial tubular housing or sleeve 57. Two ball bearings 59 are mounted between sleeve 57 and shaft 53 to enhance the stability of shaft 53 as it pivots actuator 51. Bearings 59 are lubricated with oil or grease and are prone to emit oil vapor and aerosol droplets of grease during operation.

A ferrofluid seal 61 is used to seal bearings 59 in sleeve 57 and prevent them from contaminating the disk drive. Seal 61 has an upper plate 63 and a parallel lower plate 65 which are concentric with and axially spaced apart from one another about shaft 53. Each plate 63, 65 is a flat circular member with a circular central through-hole for accommodating shaft 53. Upper plate 63 has larger inner and outer diameters than lower plate 65. Upper plate 63 is formed from a magnetically-conductive steel, such as 400 series martensitic stainless steel. The outer diameter of upper plate 63 is rigidly mounted to sleeve 57. Lower plate 65 is nonmagnetic and rigidly mounted to shaft 53. The outer diameter of lower plate 65 is spaced inward from sleeve 57. A flat annular magnet 71 is mounted to an upper surface of lower plate 65. A pair of magnetically conductive rings 72 are attached at the inner and outer diameters of magnet 71. Magnet 71 is spaced apart from a lower surface of upper plate 63 by a very small gap 73. A magnetic ferrofluid 75 is located in gap 73 between pole pieces 72 and upper plate 63.

In operation, ferrofluid 75 is used to complete the magnetic field or circuit 77 (indicated by arrows) between magnet 71, pole pieces 72 and upper plate 63 and form a seal. The rings 72 on magnet 71 act as pole pieces which concentrate and direct the magnetic flux lines 77 toward upper plate 63. Seal 61 prevents grease oil vapor and aerosol droplets emitted by bearings 59 from contaminating the rest of the disk drive. Seal 61 functions by suspending magnetically attracted ferrofluid 75 in gap 73. The suspended ferrofluid 75, which is essentially frictionless, forms a very effective liquid seal between the pivoting shaft 53 and sleeve 57.

Figure 6:
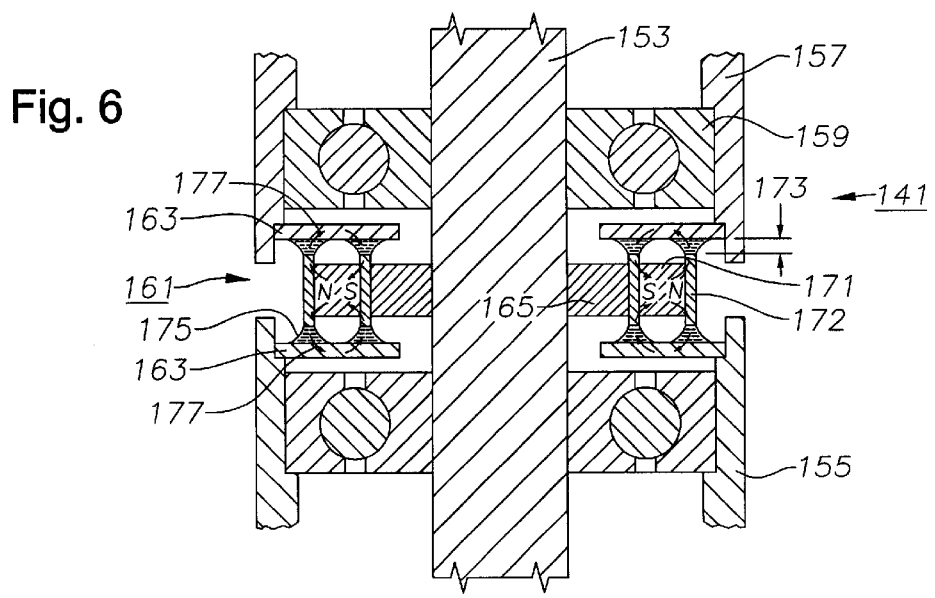
FIG. 6 is a sectional side view of a second embodiment of the ferrofluid seal of FIG. 4 for two actuators.

Referring now to FIG. 6, a second embodiment of the invention is shown. Pivot assembly 141 is provided for supporting two actuators like actuator 51 in FIG. 3. The actuators are mounted to a nonmagnetic, rotatable pivot shaft 153 which is surrounded by a pair of stationary sleeves 155, 157. Four ball bearings 159 are mounted between sleeves 155,157 and shaft 153.

A ferrofluid seal 161 is used to seal bearings 159 in sleeves 155, 157. Seal 161 has a pair of stationary plates 163 and a parallel central plate 165. Plates 163 and 165 are identical to previously described plates 63 and 65, respectively, and are mounted in an identical manner. However, one stationary plate 163 is rigidly mounted to each sleeve 155, 157.

A flat annular magnet 171 is mounted to central plate 165 and a pair of magnetically conductive rings 172 are attached at the inner and outer diameters of magnet 171. Magnet 171 is very similar to magnet 71 described above. Magnet 171 is spaced apart from each stationary plate 163 by a very small gap 173. A magnetic ferrofluid 175 is located in each gap 173 between pole pieces 172 and stationary plates 163.

In operation, seal 161 functions very similarly to seal 61. Ferrofluid 175 is used to complete a magnetic field or circuit 177 (indicated by arrows) between magnet 171, pole pieces 172 and each stationary plate 163. The rings 172 on magnet 171 act as pole pieces which concentrate and direct the magnetic flux lines 177 toward plates 163. Seal 161 operates in the same manner as seal 61 by suspending ferrofluids 175 in gaps 173 to seal the top of sleeve 155 and the bottom of sleeve 157.

The invention has significant advantages. Unlike prior art designs which require magnetic shafts to complete the magnetic circuit, this seal is compatible with nonmagnetic pivot shafts. The seal provides nearly infinite diffusion impedance to the grease oil vapor and aerosol droplets emitted by the actuator pivot bearing, thus preventing them from migrating out of the bearing and into the file. Particle counts in the 0.2 micron size range are limited by the very low vapor pressure of the carrier fluid of the magnetic particles which, for polyol ester type oils, is typically in the 10E-8 mbar range. Another advantage of this invention is that one magnet pole piece assembly can be used to form two ferrofluid seals for a two-actuator pivot assembly.

While the invention has been shown or described in only some of its forms, it should be apparent to those skilled in the art that it is not so limited, but is susceptible to various changes without departing from the scope of the invention. For example, although the magnet in the preferred embodiment rotates with the shaft relative to the upper plate, the magnet could be mounted to the upper plate which would serve as the support member. The design is also applicable to disk drive spindle motors.

I claim:

1. A hard disk drive, comprising:

a base;

a magnetic disk rotatably mounted to the base;

an actuator having a magnetic head for magnetically reading data from or magnetically writing data to the disk, the actuator being pivotally mounted to the base adjacent to the disk for relative movement thereto;

a motor having a stationary housing and a rotatable shaft for supporting the actuator, the housing and the shaft being concentric with an axis of the motor;

a bearing mounted between the shaft and the housing;

a support member mounted to the shaft;

a magnetic conductor axially spaced apart from the support member and mounted to the housing so that the magnetic conductor and the support member are rotatable relative to each other;

a magnet mounted to the support member between the support member and the magnetic conductor;

a ferrofluid located between the magnet and the magnetic conductor for sealing the bearing in the housing;

a second housing on the motor;

a second bearing mounted between the shaft and the second housing, the second bearing being axially spaced apart from said bearing;

a second magnetic conductor mounted to the second housing so that the second magnetic conductor and the support member are rotatable relative to one another; and a second ferrofluid located between the magnet and the second magnetic conductor for sealing the second bearing in the second housing.

2. A method for sealing a bearing mounted between a shaft and a housing which are rotatable relative to each other, comprising:

mounting a support member having a magnet to the shaft;

mounting a magnetic conductor to the housing such that the support member and the magnetic conductor are axially spaced apart from each other and rotatable relative to each other with the magnet therebetween;

placing a ferrofluid between the magnet and the magnetic conductor to seal the bearing in the housing;

mounting a second magnetic conductor to a second housing which is axially spaced apart from said housing, such that the support member and the second magnetic conductor are rotatable relative to each other with the magnet therebetween; and placing a second ferrofluid between the magnet and the second magnetic conductor to seal a second bearing in the second housing.

* * * * *